T. R. BEGGS.
BEER FAUCET.
APPLICATION FILED SEPT. 24, 1912.
1,077,387.
Patented Nov. 4, 1913.
2 SHEETS—SHEET 2.
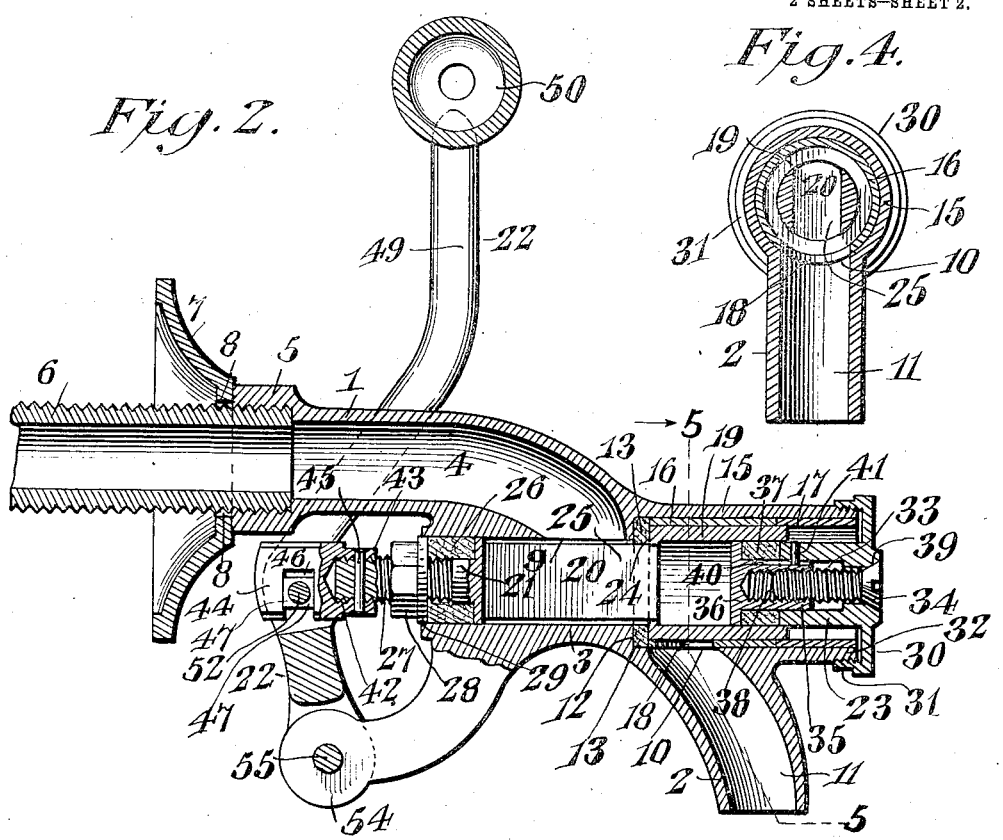
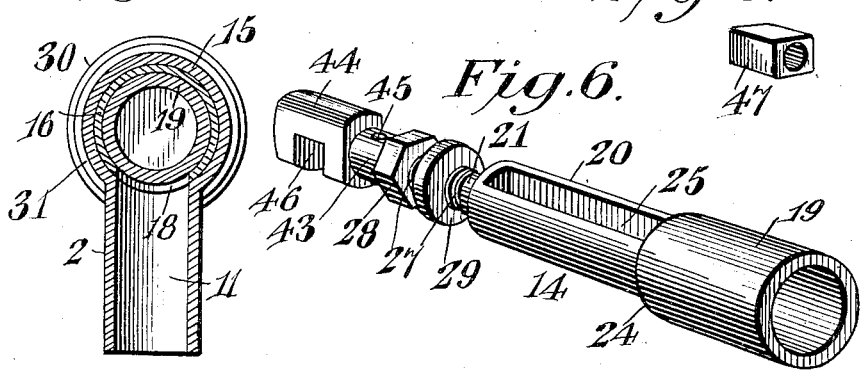
Thomas R. Beggs, INVENTOR
WITNESSES
BY
ATTORNEY

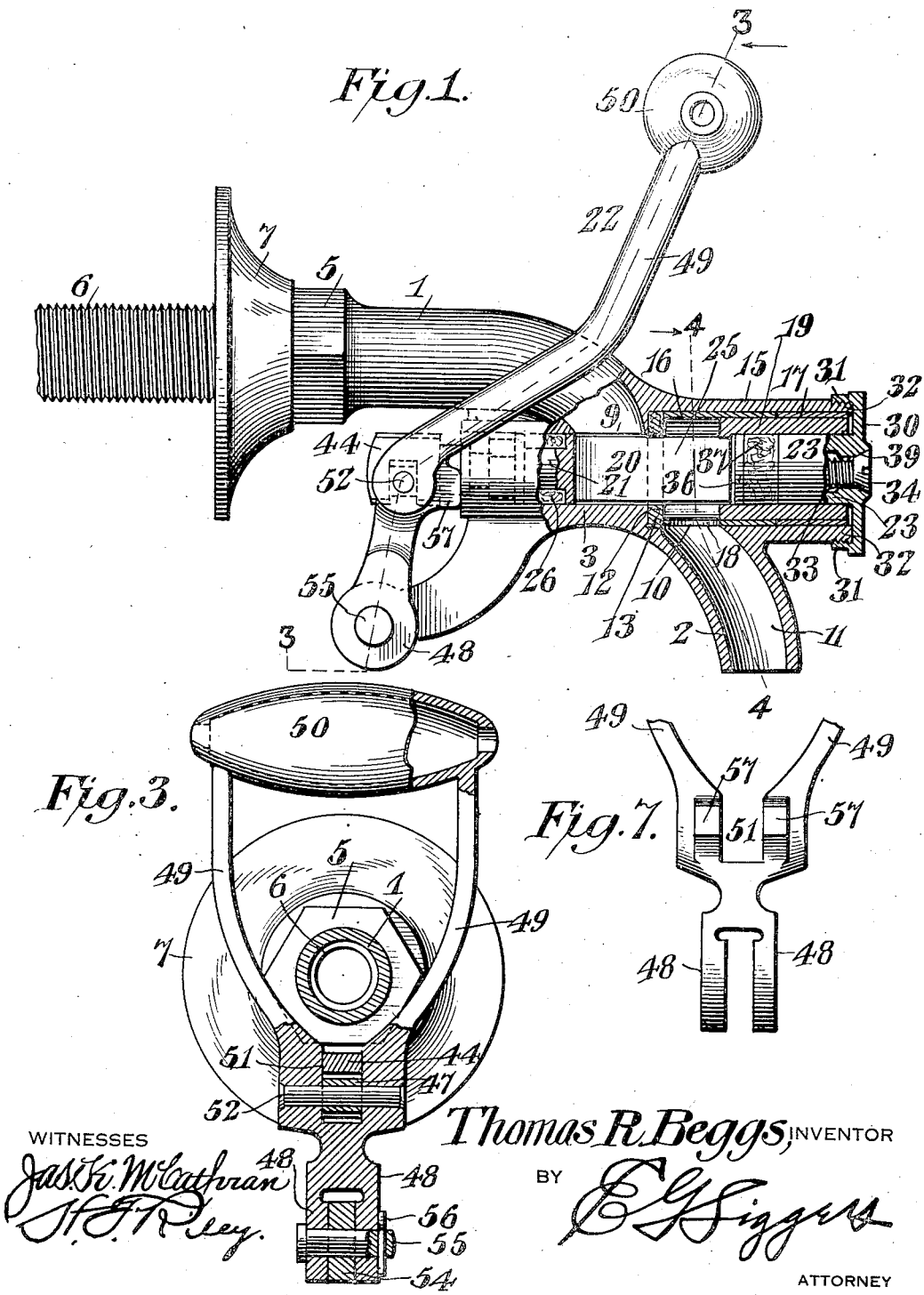

UNITED STATES PATENT OFFICE.

THOMAS R. BEGGS, OF NEW YORK, N. Y., ASSIGNOR TO JESSIE E. BEGGS, OF NEW YORK, N. Y., AND WILLIAM A. MURRAY, OF YONKERS, NEW YORK.

BEER-FAUCET.

1,077,387. Specification of Letters Patent. Patented Nov. 4, 1913.

Application filed September 24, 1912. Serial No. 722,144.

*To all whom it may concern:*

Be it known that I, THOMAS R. BEGGS, a citizen of the United States, residing at New York, in the county of New York and State of New York, have invented a new and useful Beer-Faucet, of which the following is a specification.

The invention relates to improvements in beer faucets.

The object of the present invention is to improve the construction of beer faucets, and to provide a simple, efficient and comparatively inexpensive beer faucet of strong and durable construction in which there will be no movable parts within the beer passage of the body of the faucet, which will allow the liquid to expand within the faucet in the opening movement thereof, or which will compress the liquid in the closing movement of the faucet.

A further object of the invention is to provide a faucet of this character adapted when opened to afford a clear space to permit beer or other liquid to run without any obstruction to the passage of the same through the faucet.

The invention also has for its object to provide a faucet equipped with inner and outer packings, capable of adjustment without removing the faucet or shutting off the liquid therefrom.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation partly in section of a beer faucet, constructed in accordance with this invention, and shown open. Fig. 2 is a central longitudinal sectional view of the same, the faucet being closed. Fig. 3 is a transverse sectional view on the line 3—3 of Fig. 1. Fig. 4 is a transverse sectional view on the line 4—4 of Fig. 1. Fig. 5 is a similar view on the line 5—5 of Fig. 2. Fig. 6 is a detail perspective view of the piston or plunger. Fig. 7 is a detail view of the lower portion of the operating lever. Fig. 8 is a detail perspective view of the pivotally mounted anti-friction sleeve of the operating lever.

Like numerals of reference designate corresponding parts in all the figures of the drawings.

In the accompanying drawings in which is illustrated the preferred embodiment of the invention, the body of the faucet consists of an upper substantially horizontal tubular portion or barrel 1, a lower depending spout 2 and a substantially horizontal intermediate tubular portion or casing 3, formed integral with the barrel 1 and the spout 2 and intersecting and extending in advance and in rear of the same. The barrel portion, which has a passage 4 for the beer, is provided with an enlarged rear end 5, interiorly threaded to receive a threaded pipe or tube 6, extending from a bar, or other support. The enlarged end has an exterior polygonal shape preferably of hexagonal form and adapted to receive a wrench to facilitate the connection of the faucet with the supply tube or pipe. A flaring annular plate or flange 7, which has a central opening 8, is mounted on the tube or pipe 6 adjacent to the rear end of the body of the faucet to afford a neat finish.

The intermediate tubular portion or casing 3 is provided with upper and lower openings 9 and 10 offset from each other and communicating, respectively, with the passage 4 of the barrel and with the passage 11 of the spout 2, and located in rear and in advance of an intervening vertical shoulder 12. The vertical shoulder 12 constitutes a valve seat and receives a gasket 13, which is engaged by a piston or plunger 14, operating within the tubular portion or casing to form a horizontal gate for cutting off the flow of the liquid. The outer portion 15 of the intermediate casing 3 is enlarged and it receives a metallic lining consisting of inner and outer bushings 16 and 17. The inner end of the metallic lining fits against the gasket 13 and retains the same against the shoulder 12 and the inner section or bushing 16 of the lining is provided at the bottom with an opening 18, which communicates with the passage 11 of the spout.

The piston or plunger consists of an outer enlarged imperforate cylindrical portion 19 and a reduced inner portion 20 provided at the rear end with an integral stem 21 with which an operating lever 22 is connected. The outer cylindrical portion 19, which fits snugly within the said metallic lining, is open at the outer or front end to slide over a cylindrical plug 23, and is provided at its inner end with a shoulder 24 to engage the gasket 13. The plug 23 closes the outer end of the imperforate cylindrical portion or head 19, which, when at the limit of its inward or rearward movement, fits against the gasket 13 and covers the opening 18 in the metallic bushing 16 and the bottom of the intermediate tube or casing of the body and cuts off the flow of liquid to the spout. The plug when adjusted remains stationary, and there is no compression of the liquid in the closing movement of the plunger of the faucet. The inner portion 20 of the plunger is provided with a longitudinal slot or opening 25, which in the forward or opening movement of the piston, is carried into register with the upper end of the spout, as clearly illustrated in Fig. 1 of the drawings. The opening 25 is of a length to extend from the rear or inner wall of the upper opening 9 to the outer or front wall of the opening 10 and connects the barrel and affords an unobstructed passage of liquid through the faucet. The inner reduced portion 20 of the piston is cylindrical and fits the bore or opening of the inner smaller portion of the intermediate casing of the body of the faucet. The stem 21, which is of a less diameter than the inner slotted cylindrical portion 20, receives and supports an inner packing 26, and its rear portion 27 is threaded to receive a nut 28 for compressing the packing 26, a metallic washer 29 being preferably interposed between the nut and the packing, as clearly illustrated in Fig. 2 of the drawings. The packing fits within the inner end of the intermediate tubular portion or casing 3, and is compressed between the washer and the shoulder formed by the inner end of the inner cylindrical portion 20 of the piston, and it prevents leakage at the inner end of the piston. The nut 28 is exposed at the rear end of the intermediate tubular portion or casing of the faucet when the latter is closed, and the packing 26 may be adjusted without disconnecting the faucet or cutting off the flow of liquid to the same.

The plug 23, which closes the outer end of the piston, is cylindrical and is formed integral with a cap 30, provided at its periphery with an interiorly threaded flange 31, which engages the exterior threaded outer end 32 of the intermediate tubular portion or casing. The cylindrical plug 23 is tubular and has a central bore or opening 33 for the passage of an adjusting screw 34 and also to receive a tubular stem 35 of an adjusting packing engaging member 36, adapted to compress an outer packing 37 between it and the inner end of the plug. The member 36 consists of a circular head or disk, and the tubular stem, which supports the packing 37, is provided with interior screw threads 38, which are engaged by the screw 34. The screw passes through the cap or closure, and its head is arranged in a countersunk opening 39 of the same, and it is adapted to be turned to adjust the packing compressing member 36. In order to prevent the packing engaging member 36 from rotating when the screw is turned, the tubular stem 35 is provided with an exterior longitudinal groove 40, which is engaged by a pin 41, piercing the plug at one side thereof and extending into the bore or opening of the same to form an interior projection. The outer packing prevents any leakage at the outer end of the piston, and it is adapted to be adjusted without disconnecting the faucet or cutting off the flow of liquid to the same.

The threaded portion 27 of the stem 21 engages interior screw threads 42 of a socket 43 of a coupling piece or member 44, which is rigidly secured to the threaded portion of the stem by a pin or rivet 45. The pin or rivet 45 pierces the socket 43 and the threaded portion 27 of the stem and is headed at its ends, as clearly illustrated in Fig. 2 of the drawings. The coupling piece or member 44 is provided at its lower portion with a rectangular recess or bifurcation 46 to fit over a squared anti-friction sleeve 47, which is carried by the operating lever 22. The operating lever 22 consists of a lower approximately straight portion 48 and an upper loop formed by spaced sides 49 and a transversely disposed grip or handle 50, which connects the upper ends of the sides 49. The grip or handle 50, which is preferably hollow, as shown, is formed integral with the sides 49, the operating lever preferably consisting of a single casting. The loop is provided at the bottom with a recess 51 to receive the coupling head or member 44, and the said anti-friction sleeve 47 is mounted in the recess 51 on a transverse pivot or pin 52, which pierces the operating lever at opposite sides of the recess 51, as clearly illustrated in Fig. 3 of the drawings. The lower end of the operating lever 22 is provided with a slot or bifurcation 53 to straddle an inclined bracket arm 54, formed integral with the body portion of the faucet and extending downwardly and rearwardly from the inner end of the intermediate tubular portion or casing of the said body. The bifurcated lower end of the lever is pivoted to the bracket by a transverse pin 55, piercing the lever and the bracket and having a head at one end and provided at the other end with a perforation for the reception of a key or cotter pin 56, but the operating lever may be pivoted to the bracket in any other suitable manner.

The operating lever is provided at the front at opposite sides of the recess 51 with projecting lugs 57, spaced apart and arranged to engage the inner or rear end of the intermediate tubular portion or casing for limiting the forward or outward movement of the operating lever. The upper or loop portion of the operating lever viewed in side elevation is angular, and the upper portion of the loop is arranged in approximately a vertical position, as illustrated in Fig. 2 of the drawings, when the faucet is closed, and it swings forward to the inclined position, shown in Fig. 1, in the opening movement of the faucet. This oscillatory movement of the operating lever reciprocates the piston within the intermediate tubular portion or casing of the faucet and carries the same into its opened and closed positions. The polygonal anti-friction sleeve provides a substantially frictional pivotal connection between the oscillatory lever and the reciprocatory piston.

What is claimed is:—

1. A faucet of the class described including a body comprising an upper barrel, a lower spout, and an intermediate tubular portion or casing intersecting the barrel and the spout and communicating therewith, a piston operating in the intermediate tubular portion below the plane of the upper barrel and having means for cutting off communication between the barrel and the spout, and an operating lever fulcrumed on the body and connected with the inner end of the piston for reciprocating the same.

2. A faucet of the class described including a body comprising an upper substantially horizontal barrel, a lower depending spout, and an intermediate substantially horizontal tubular portion or casing intersecting the barrel and the spout and located below the plane of the upper barrel and extending in advance and in rear of the same, a piston operating in the intermediate tubular portion or casing and provided with means for cutting off communication between the barrel and the spout, and an oscillatory operating lever fulcrumed on the body and connected with the rear end of the piston and adapted to reciprocate the same.

3. A faucet of the class described including a body comprising an upper substantially horizontal barrel, a lower depending spout, an intermediate substantially horizontal tubular portion or casing intersecting the barrel and the spout and extending in advance and in rear of the same, and a bracket arm formed integral with and extending rearwardly from the rear end of the intermediate tubular portion or casing, a piston operating within the intermediate tubular portion or casing and provided with means for cutting off communication between the barrel and the spout, and an oscillatory operating lever pivoted at its lower end to the bracket arm and connected at an intermediate point with the rear end of the piston and extending above the body.

4. A faucet of the class described including a body comprising an upper substantially horizontal barrel, a lower depending spout, and an intermediate substantially horizontal tubular portion or casing intersecting the barrel and the spout and extending in advance and in rear of the same, a piston operating in the intermediate tubular portion or casing and provided with means for cutting off communication between the barrel and the spout, and an oscillatory operating lever pivoted at its lower end to the body at a point below the piston and provided with an upper loop portion receiving the barrel and provided at the top with a handle or grip, said operating lever being connected at an intermediate point with the rear end of the piston.

5. A faucet of the class described including a body comprising an upper substantially horizontal barrel, a lower depending spout, an intermediate substantially horizontal tubular portion or casing intersecting the barrel and the spout and extending in advance and in rear of the same, a piston operating in the intermediate tubular portion or casing and provided with means for cutting off communication between the barrel and the spout, a coupling member carried by the rear end of the piston and provided with a bottom recess, an oscillatory lever pivotally connected at the lower end with the body and provided with an upper loop portion receiving the barrel, and an anti-friction sleeve pivoted at the bottom of the loop of the lever and arranged in the recess of said coupling member.

6. A faucet of the class described including a body comprising an upper substantially horizontal barrel, a lower depending spout, an intermediate substantially horizontal tubular portion or casing intersecting the barrel and the spout and extending in advance and in rear of the same, a piston operating in the intermediate tubular portion or casing and provided with means for cutting off communication between the barrel and the spout, a coupling member carried by the rear end of the piston and provided with a bottom recess, an oscillatory lever pivotally connected at the lower end with the body and provided with an upper loop portion receiving the barrel and provided at the bottom with a recess into which the coupling member extends, and a polygonal sleeve pivotally mounted in the recess of the operating lever and detachably engaging the recess of the coupling member.

7. A faucet of the class described including a body comprising an upper barrel, a lower spout, and an intermediate tubular portion or casing intersecting the barrel and the spout below the plane of the upper barrel and communicating at the top and bottom with the same and provided with an intervening shoulder forming a valve seat, a reciprocatory piston operating in the tubular portion or casing and located below the plane of the upper barrel and provided with a head coacting with the valve seat, and means for operating the piston.

8. A faucet of the class described including a body comprising an upper barrel, a lower spout, and an intermediate tubular portion or casing intersecting the barrel and the spout and communicating with the same at spaced points and provided with an intervening shoulder located at a point intermediate of the ends of the tubular portion, a gasket fitted against the shoulder, a removable lining arranged within the tubular portion or casing and retaining the gasket against the shoulder, a piston operating within the tubular portion or casing and having a head movable inwardly or rearwardly to engage the gasket and forwardly or outwardly therefrom to open the faucet, and means for reciprocating the piston.

9. A faucet of the class described including an upper barrel, a lower spout, and an intermediate tubular portion or casing communicating at spaced points with the barrel and the spout and having an intervening shoulder, a piston operating within the tubular portion or casing and provided at the front with a head coacting with the shoulder, said piston being also provided in rear of the head with an opening adapted to establish communication between the barrel and the spout when the piston is moved forwardly or outwardly, and means for operating the piston.

10. A faucet of the class described including an upper barrel, a lower depending spout, and an intermediate tubular portion intersecting the barrel and the spout and communicating therewith at spaced points and having an intervening valve seat, a piston operating in the tubular portion and consisting of a front cylindrical head, and a reduced slotted rear portion, the head of the piston coacting with the valve seat and the slotted portion establishing a communication between the barrel and the spout when the piston is moved forwardly, and means for operating the piston.

11. A faucet of the class described including a body comprising an upper barrel, a lower spout, and an intermediate tubular portion or casing intersecting the barrel and the spout and consisting of an enlarged front portion extending in advance of the barrel and the spout, and a reduced rear portion, said tubular portion or casing having a valve seat arranged at a point between the barrel and the spout, a piston consisting of a front cylindrical head and a reduced inner portion and having a shoulder to coact with the valve seat and provided in rear of the shoulder with an opening to establish communication between the barrel and the spout, and means for reciprocating the piston.

12. A faucet of the class described including a body comprising an upper barrel, a depending spout, and an intermediate tubular portion or casing intersecting the barrel and the spout and having an intervening valve seat, a piston operating within the intermediate tubular portion or casing and provided with a cylindrical head coacting with the valve seat and open at the front end, said piston being also provided in rear of the head with an opening to establish communication between the barrel and the spout, means for reciprocating the piston, and a relatively fixed plug arranged in the path of the piston and extending into the cylindrical head and forming a closure for the front end of the same.

13. A faucet of the class described including a body comprising an upper barrel, a depending spout, and an intermediate tubular portion or casing intersecting the barrel and the spout and having an intervening valve seat, a piston operating within the intermediate tubular portion or casing and provided with a cylindrical head coacting with the valve seat and open at the front end, said piston being also provided in rear of the head with an opening to establish communication between the barrel and the spout, means for reciprocating the piston, and a cap secured on the front end of the tubular portion or casing and provided with an inwardly extending plug fitting in and forming a closure for the cylindrical head of the piston.

14. A faucet of the class described including a body comprising a barrel, a spout, and an intermediate tubular portion or casing having a valve seat, a piston operating in the tubular portion or casing and provided with a tubular head coacting with the valve seat and open at the front end, a closure secured to the outer end of the tubular portion or casing and provided with a plug extending into the piston and forming a closure for the same, a packing carried by the plug, and exteriorly operable means also carried by the closure and arranged to compress the packing.

15. A faucet of the class described including a body comprising a barrel, a spout, and an intermediate tubular portion or casing having a valve seat, a piston operating in the tubular portion or casing and provided with a tubular head coacting with the valve seat and open at the front end, a closure secured to the outer end of the tubular portion or casing and provided with a plug extending into the piston and forming a closure for the same, a packing carried by the plug, an adjustable member arranged to compress the packing between it and the plug, and an exteriorly operable screw carried by the closure and connected with and adapted to adjust the said member.

16. A faucet of the class described including a body comprising a barrel, a spout, and an intermediate tubular portion or casing having a valve seat, a piston operating in the tubular portion or casing and provided with a tubular head coacting with the valve seat and open at the front end, a closure secured to the outer end of the tubular portion or casing and provided with a tubular plug arranged in advance of the piston, an adjustable member having an interiorly threaded portion extending into and slidably connected with the plug, a packing arranged to be compressed between the said member and the plug and fitting the interior of the cylindrical head of the piston, and a screw extending through the closure and engaging the interiorly threaded portion of the said member.

17. A faucet of the class described including a body comprising a barrel, a spout, and an intermediate tubular portion or casing, a piston operating within the intermediate tubular portion or casing and provided with a reduced rear portion, a packing carried by the reduced rear portion of the piston and arranged within the tubular portion or casing, exteriorly operable means mounted on the rear end of the piston for adjusting the packing, and means also connected with the rear end of the piston for operating the same.

18. A faucet of the class described including a body comprising a barrel, a spout, and an intermediate tubular portion or casing, a piston operating within the intermediate tubular portion or casing and provided with a reduced threaded rear portion, a packing carried by the piston and arranged within the tubular portion or casing, a nut mounted on the threaded portion of the piston for adjusting the packing, and means for reciprocating the piston.

19. A faucet of the class described including a body comprising a barrel, a spout, and an intermediate tubular portion or casing, a piston operating within the tubular portion or casing and having a threaded inner end, a coupling member having an interiorly threaded socket secured on the threaded end of the piston, and an operating lever fulcrumed on the body and connected with the coupling member for reciprocating the piston.

20. A faucet of the class described including a barrel, a spout, and an intermediate tubular portion or casing communicating at spaced points with the barrel and the spout and having an intervening valve seat, a piston operating in the tubular portion or casing and coacting with the valve seat and having a front tubular head, a plug extending into the head of the piston and having a packing fitting the interior of the same, rear packing mounted on the piston and fitting the intermediate tubular portion, and front and rear exteriorly operable means for adjusting the said packing.

In testimony, that I claim the foregoing as my own, I have hereto affixed my signature in the presence of two witnesses.

THOMAS R. BEGGS.

Witnesses:
 WILLIAM A. MUNN,
 FRANK H. COYNE.